US009689692B2

(12) United States Patent
Takehara et al.

(10) Patent No.: US 9,689,692 B2
(45) Date of Patent: Jun. 27, 2017

(54) CHARGING FACILITY INFORMATION PROVIDING SYSTEM AND ELECTRICALLY DRIVEN VEHICLE

(71) Applicant: Mitsubishi Electric Corporation, Tokyo (JP)

(72) Inventors: Takayoshi Takehara, Tokyo (JP); Takanori Matsunaga, Tokyo (JP); Toshihide Satake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 14/635,450

(22) Filed: Mar. 2, 2015

(65) Prior Publication Data

US 2015/0354974 A1 Dec. 10, 2015

(30) Foreign Application Priority Data

Jun. 9, 2014 (JP) .................................. 2014-118284

(51) Int. Cl.
*B60L 9/00* (2006.01)
*B60L 11/00* (2006.01)
(Continued)

(52) U.S. Cl.
CPC ...... *G01C 21/3407* (2013.01); *B60L 11/1824* (2013.01); *B60L 11/1838* (2013.01);
(Continued)

(58) Field of Classification Search
CPC ............. B60L 11/1824; B60L 15/2045; B60L 11/1838; G01C 21/3469; G01C 21/3407; Y02T 90/16
(Continued)

(56) References Cited

U.S. PATENT DOCUMENTS 8,564,454 B2 10/2013 Oizumi et al.
8,954,223 B2 2/2015 Hoshihara et al.
(Continued)

FOREIGN PATENT DOCUMENTS

CN 102473351 A 5/2012
CN 102770304 A 11/2012
(Continued)

OTHER PUBLICATIONS

Fumitoshi Emura et al., Automotive Technologies for Smart Cities and their Global Deployment, Hitachi Review, Nov. 2013, pp. 76-80, vol. 63, No. 2.
(Continued)

*Primary Examiner* — Isaac Smith
(74) *Attorney, Agent, or Firm* — Sughrue Mion, PLLC; Richard C. Turner

(57) ABSTRACT

A charging facility information providing system includes: an electrically driven vehicle, a charging facility, and a management center, wherein, in the case of charging the storage battery, the electrically driven vehicle and the charging facility perform charge communication, the electrically driven vehicle sends travel plan information, to the charging facility by the charge communication during the charge of the storage battery, the charging facility transfers the travel plan information sent from the electrically driven vehicle to the management center through an information network, then based on the travel plan information received from the charging facility, the management center creates a charging plan which is matched with the running route of the electrically driven vehicle, acquires charging facility information of a charging facility at a scheduled charging place included in the charging plan, and sends the charging plan and the charging facility information to the charging facility through the information network and the charging facility (Continued)

transfers the acquired charging plan and the charging facility information to the electrically driven vehicle by the charge communication.

7 Claims, 18 Drawing Sheets

(51) Int. Cl.
    *G05D 1/00* (2006.01)
    *G01C 21/34* (2006.01)
    *B60L 11/18* (2006.01)
    *G01C 21/36* (2006.01)
    *G06Q 10/06* (2012.01)

(52) U.S. Cl.
    CPC ..... *G01C 21/3469* (2013.01); *G01C 21/3605* (2013.01); *G01C 21/3679* (2013.01); *B60L 2240/60* (2013.01); *B60L 2240/72* (2013.01); *B60L 2250/14* (2013.01); *G06Q 10/06* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/163* (2013.01)

(58) Field of Classification Search
    USPC .......................................... 701/22, 423, 426
    See application file for complete search history.

(56) References Cited

U.S. PATENT DOCUMENTS

| | | | |
|---|---|---|---|
| 8,996,213 | B2 | 3/2015 | Ishikawa et al. |
| 9,126,493 | B2 | 9/2015 | Suganuma et al. |
| 2009/0246596 | A1 | 10/2009 | Sridhar et al. |
| 2011/0224900 | A1 | 9/2011 | Hiruta et al. |
| 2012/0098676 | A1* | 4/2012 | Oizumi ............... B60L 11/1824 340/901 |
| 2012/0306446 | A1* | 12/2012 | Suganuma .......... B60L 11/1824 320/109 |
| 2013/0079962 | A1* | 3/2013 | Ishikawa ............. B60L 15/2045 701/22 |
| 2013/0093393 | A1 | 4/2013 | Shimotani et al. |
| 2013/0218402 | A1 | 8/2013 | Hoshihara et al. |
| 2014/0049206 | A1 | 2/2014 | Sridhar et al. |
| 2014/0163877 | A1* | 6/2014 | Kiyama ............. G01C 21/3469 701/533 |

FOREIGN PATENT DOCUMENTS

| | | | |
|---|---|---|---|
| CN | 103010040 A | | 4/2013 |
| CN | 103052529 A | | 4/2013 |
| CN | 103402810 A | | 11/2013 |
| JP | 2008-100645 A | | 5/2008 |
| JP | 2008100645 A | * | 5/2008 |
| JP | 2011-13893 A | | 1/2011 |
| JP | 2011-517261 A | | 5/2011 |
| JP | 4692466 B2 | | 6/2011 |
| JP | 2011-185785 A | | 9/2011 |
| JP | 2012-154781 A | | 8/2012 |
| JP | 2013-188103 A | | 9/2013 |
| JP | 2013-250801 A | | 12/2013 |
| JP | 2014-85272 A | | 5/2014 |

OTHER PUBLICATIONS

Communication dated Aug. 18, 2015 from the Japanese Patent Office in counterpart application No. 2014-118284.

Communication dated Feb. 4, 2017, from the State Intellectual Property Office of People's Republic of China in counterpart Application No. 201510309655.1.

* cited by examiner

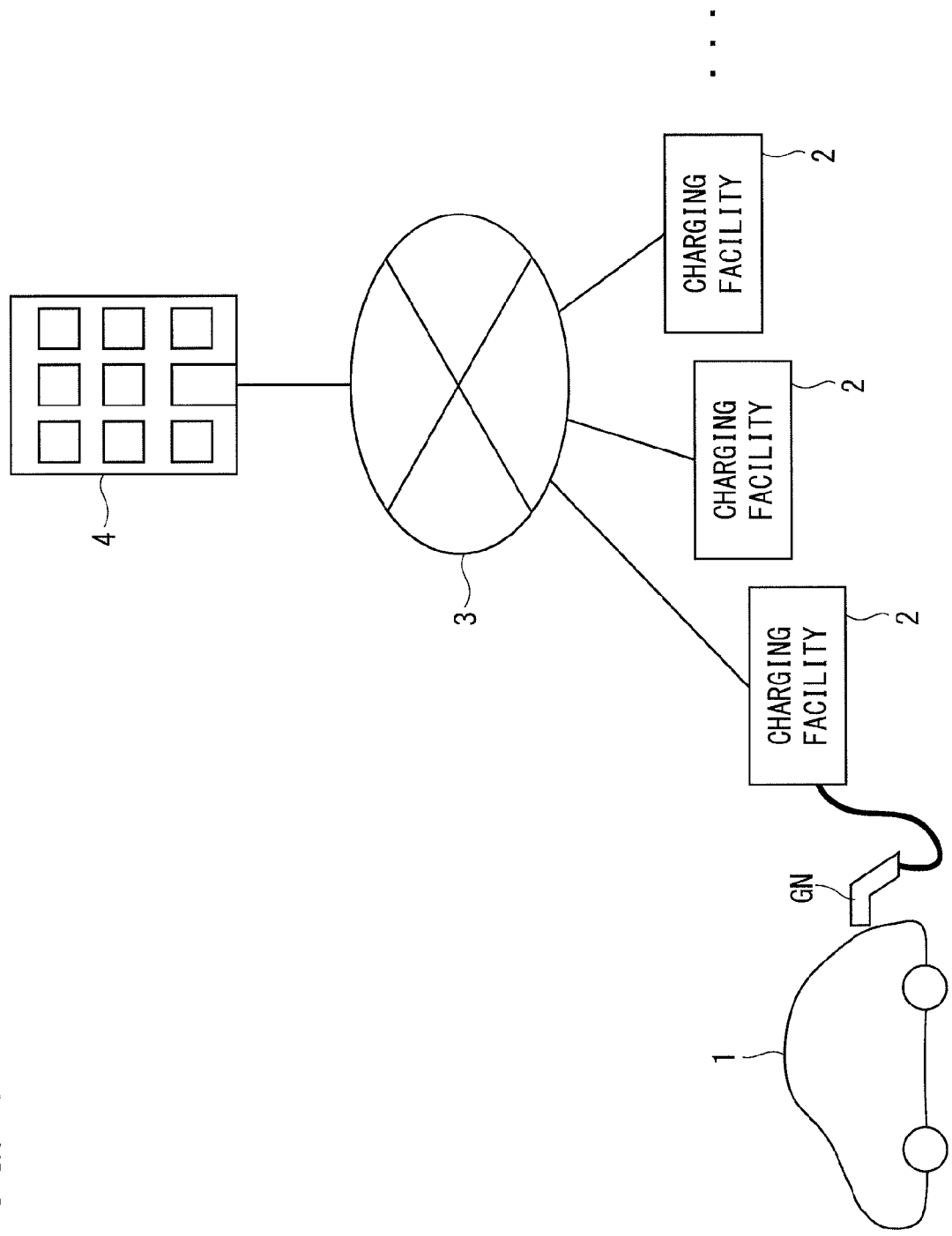

F I G. 2

| PLACE OF DEPARTURE | 34.829303, 134.677981 | | TIME OF DEPARTURE | 9:00 |
|---|---|---|---|---|
| PLACE OF TRANSIT 1 | POSITION | 34.582441, 135.021521 | CAPACITY OF STORAGE BATTERY | 20kWh |
| | STAYING TIME | 1.0h | SCHEDULED RESIDUAL QUANTITY OF STORAGE BATTERY AT TIME OF DEPARTURE | 95% |
| PLACE OF TRANSIT 2 | POSITION | 34.345313, 134.738294 | | |
| | STAYING TIME | 1.0h | TARGET RESIDUAL QUANTITY OF STORAGE BATTERY | 20% |
| DESTINATION | 34.829303, 134.677981 | | VEHICLE TYPE | AAA |

FIG. 3

| IDENTIFIER | | 1 | | PLACE | PLACE OF TRANSIT 2 |
|---|---|---|---|---|---|
| PLACE OF TRANSIT 1 | POSITION | 34.582441, 135.021521 | CHARGE 1 | TIME | 0.5h |
| | STAYING TIME | 1.0h | | QUANTITY OF POWER | 12kWh |
| PLACE OF TRANSIT 2 | POSITION | 34.342746, 134.89556 | | FEE | ¥500 |
| | STAYING TIME | 0.5h | ESTIMATED ARRIVAL TIME | | 19 : 00 |
| PLACE OF TRANSIT 3 | POSITION | 34.345313, 134.738294 | | | |
| | STAYING TIME | 1.0h | | | |

FIG. 4

| CHARGING FACILITY 1 | POSITION | 34.342746, 134.89556 |
|---|---|---|
| | OUTPUT | 40.0kWh |
| | CONGESTION DEGREE | TWO |

F I G. 1 3
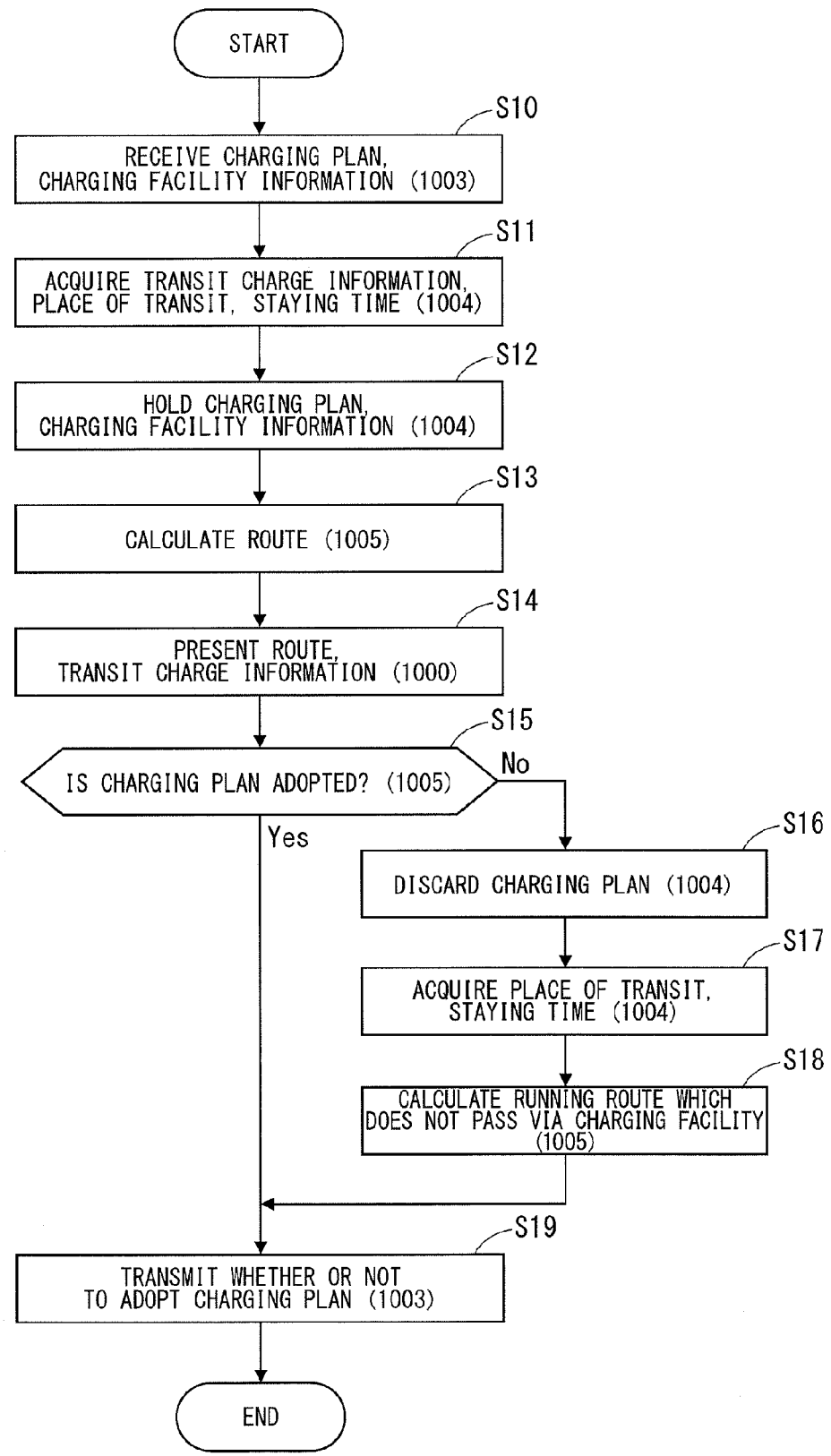

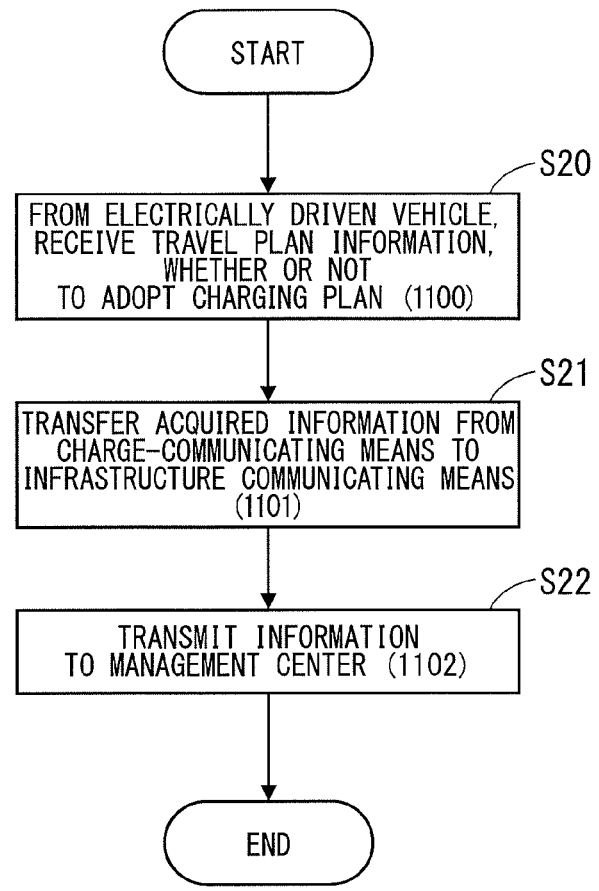

US 9,689,692 B2

CHARGING FACILITY INFORMATION PROVIDING SYSTEM AND ELECTRICALLY DRIVEN VEHICLE

BACKGROUND OF THE INVENTION

Field of the Invention

The present invention relates to a charging facility information providing system, and particularly, relates to a charging facility information providing system for an electrically driven vehicle such as an EV (electric vehicle) and a PHEV (plug-in hybrid electric vehicle).

Description of the Background Art

In a long-distance movement by an electrically driven vehicle at leisure or the like, a situation is considered where a driver does not know via which charging facility the driver should pass since the driver drives on an unfamiliar area. In such a case, in addition to searching for a route to a destination by a navigation system or the like, it is necessary for such a user to search charging facilities on peripheries of the route in advance, and this is cumbersome.

As a charging facility information providing system for an electrically driven vehicle, for example, as disclosed in Japanese Patent Application Laid-Open No. 2013-250801, there is known a method in which a mobile communication terminal transmits current place information and destination information of the vehicle and a residual quantity of a power source to a server, and upon receiving these, the server selects a refilling point where the vehicle should be charged, and transmits information regarding the refilling point to the mobile communication terminal.

However, in the method of Japanese Patent Application Laid-Open No. 2013-250801, there has been a problem in that, in addition to an already placed charging system, the mobile communication terminal is required to acquire information of the charging facilities, and the current place information, the destination information and the residual quantity of the power source must be transmitted to the server using the mobile communication terminal, resulting in application of a load to the user.

SUMMARY OF THE INVENTION

It is an object of the present invention to provide a charging facility information providing system capable of acquiring optimum charging plan and charging facility information without applying the load to the user.

A charging facility information providing system according to the present invention includes: an electrically driven vehicle that runs by using, as a drive source, a motor driven by power accumulated in a storage battery; a charging facility that charges the storage battery of the electrically driven vehicle; and a management center that exchanges information regarding the electrically driven vehicle with the charging facility through an information network, wherein, in the case of charging the storage battery, charge communication that mutually communicates information for controlling the charge is performed between the electrically driven vehicle and the charging facility, during the charge of the storage battery, the electrically driven vehicle sends travel plan information which includes a future running route of itself, to the charging facility by the charge communication, the charging facility transfers the travel plan information which is sent from the electrically driven vehicle, to the management center through the information network, then based on the travel plan information received from the charging facility, the management center creates a charging plan which is matched with the running route of the electrically driven vehicle, acquires charging facility information of a charging facility at a scheduled charging place included in the charging plan, and sends the charging plan and the charging facility information to the charging facility through the information network and the charging facility transfers the acquired charging plan and charging facility information to the electrically driven vehicle by the charge communication.

In accordance with the charging facility information providing system described above, the travel plan information is transmitted from the electrically driven vehicle by using the already placed charge communication, and the creation of the charging plan and the acquisition of the charging facility information are performed in the management center, and accordingly, shortage of the charge in the electrically driven vehicle can be avoided without requiring high-level calculation or a mobile information terminal in the electrically driven vehicle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram illustrating a configuration of a charging facility information providing system according to the present invention;

FIG. 2 is a table illustrating an example of travel plan information;

FIG. 3 is a table illustrating an example of a charging plan;

FIG. 4 is a table illustrating an example of charging facility information;

FIG. 13 is a flowchart explaining reception processing for the charging plan and the charging facility information in the electrically driven vehicle;

FIG. 14 is a flowchart explaining transfer processing to the management center in the charging facility;

DESCRIPTION OF THE PREFERRED EMBODIMENTS

Figure 5:
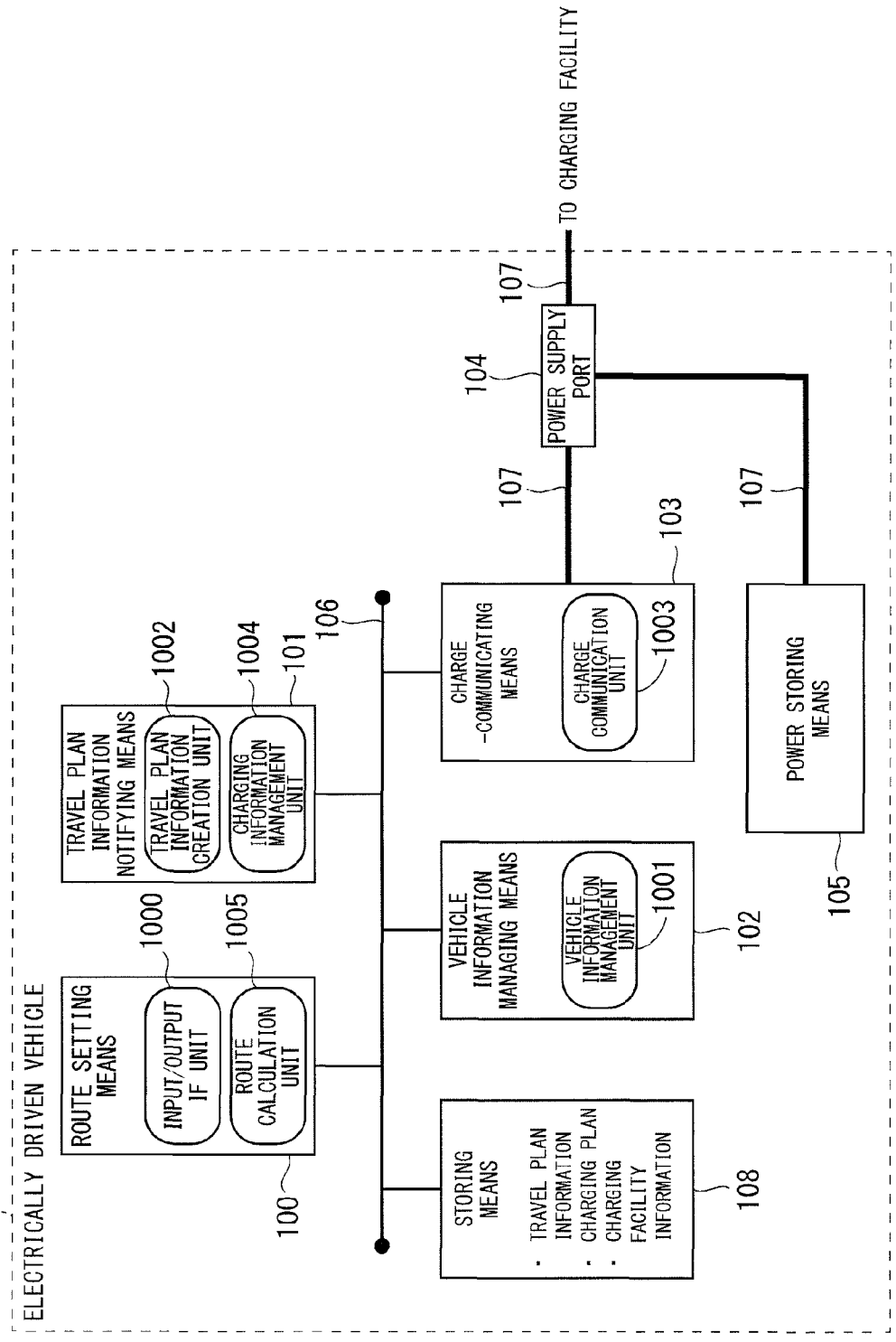
FIG. 5 is a block diagram illustrating a configuration of an electrically driven vehicle.

<Preferred Embodiment>
<Configuration of System>

FIG. 1 is a schematic diagram illustrating a configuration of a charging facility information providing system according to a preferred embodiment of the present invention. As illustrated in FIG. 1, the charging facility information providing system is composed of: an electrically driven vehicle 1; a plurality of charging facilities 2 provided on parking spaces such as houses and shops; an information network 3; and a management center 4 that manages power supply from the charging facilities 2 to the electrically driven vehicle 1.

The electrically driven vehicle 1 is, for example, such as an electric vehicle (EV) and a plug-in hybrid electric vehicle (PHEV), which is capable of running by using, as a drive source, a motor driven by power accumulated in a storage battery. In a case where the electrically driven vehicle 1 is the EV, the electrically driven vehicle 1 runs by using a motor (not shown) as a drive source. In a case where the electrically driven vehicle 1 is the PHEV, the electrically driven vehicle 1 runs by using a motor and an engine (either not shown) as drive sources.

When a charging gun GN of each of the charging facilities 2 is inserted into a power supply port (not shown) of the electrically driven vehicle 1, the electrically driven vehicle 1 connects communication to the charging facility 2 by so-called charging communication, in which information for controlling charge by power line communication (PLC) using a charging cable, or the like is mutually communicated therebetween, and then the charging facility 2 connects communication to the management center 4 through the information network 3. Hence, it is the charging facility 2 that the electrically driven vehicle 1 connects the connection to.

The electrically driven vehicle 1 communicates with the charging facility 2 and the management center 4, and charges a driving storage battery (not shown), and meanwhile, in a case where a running route is set in advance, the electrically driven vehicle 1 transmits travel plan information, which includes the running route, information on the storage battery, and the like, to the charging facility 2. Upon receiving the travel plan information from the electrically driven vehicle 1 by charge communication after starting the charge to the electrically driven vehicle 1, the charging facility 2 transfers the received travel plan information to the management center 4.

Note that, in this preferred embodiment, such storage battery information indicates a storage battery capacity and a scheduled storage battery residual quantity at a time of departure, and the travel plan information indicates a place of departure, which is a current place of the electrically driven vehicle 1, a place of transit, a destination, a time of departure, a staying time, the storage battery information, a target residual quantity of the storage battery, and a vehicle type. FIG. 2 illustrates an example of the travel plan information including the storage battery information.

As illustrated in FIG. 2, position information such as the place of departure, the place of transit, and the destination is represented by a longitude and a latitude, and the scheduled residual quantity of the storage battery at the time of departure and the target residual quantity of the storage battery are represented by ratios (%) to the storage capacity of the storage battery.

Upon receiving the travel plan information of the electrically driven vehicle 1 from the charging facility 2 through the information network 3, the management center 4 creates an optimum charging plan of the electrically driven vehicle 1, and returns the created charging plan to the charging facility 2 together with charging facility information. Upon receiving the charging plan from the management center 4, the charging plan 2 transfers the charging plan to the electrically driven vehicle 1.

Note that, in this embodiment, the charging plan includes information of: an identifier; a place of transit which includes the charging facility; a staying time which includes a charging time; a place of the charging facility 2 in each of areas; the charging time; charged power; a charge fee; and an estimated arrival time at the destination. Moreover, the charging facility information includes information of a position, output and congestion degree of the charging facility 2. FIG. 3 illustrates an example of the charging plan, and FIG. 4 illustrates an example of the charging facility information.

As illustrated in FIG. 3, the position information of the place of transit is represented by a longitude and a latitude, and the place of the charging facility 2 is represented as a name of the place of transit. Moreover, as illustrated in FIG. 4, the position information of the charging facility 2 is represented by a longitude and a latitude, and the congestion degree is represented by the number of vehicles scheduled to be charged in the same time period as the electrically driven vehicle 1.

Note that, in the travel plan information illustrated in FIG. 2, the electrically driven vehicle 1 is scheduled to pass via a place of transit 1 and a place of transit 2, and meanwhile, in the travel plan information illustrated in FIG. 3, the electrically driven vehicle 1 is scheduled to pass via the place of transit 1, the place of transit 2 and a place of transit 3. This is because the place of transit 2 is a scheduled charging place, and the electrically driven vehicle 1 is charged at the place of transit 2 before arriving at the place of transit 3. Note that the place of transit 3 corresponds to a place of transit 2 in the travel plan information.

Upon receiving the charging plan from the charging facility 2, the electrically driven vehicle 1 presents the charging plan to the user by an input/output interface (not shown) such as a car navigation system. When the user accepts or refuses the charging plan by the input/output interface, the electrically driven vehicle 1 transmits information as to whether or not to adopt the charging plan to the charging facility 2. Upon receiving the information as to whether or not to adopt the charging plan from the electrically driven vehicle 1 by the charge communication, the charging facility 2 transfers the received information to the management center 4. Upon receiving the information as to whether or not to adopt the charging plan from the charging facility 2, the management center 4 updates the charging facility information by incorporating a charging schedule of the electrically driven vehicle 1 therein in a case where the information concerned is adopted, and meanwhile, the management center 4 discards the charging plan in a case where the information concerned is not adopted.

<Configurations of Electrically Driven Vehicle, Charging Facility and Management Center>

A description is made of configurations of the electrically driven vehicle 1, the charging facility 2 and the management center 4. FIG. 5 is a block diagram illustrating an example of the configuration of the electrically driven vehicle 1. As illustrated in FIG. 5, the electrically driven vehicle 1 includes route setting means 100, travel plan information notifying means 101, vehicle information managing means 102, charge-communicating means 103 and storing means 108 as constituents connected to an in-vehicle network 106. Moreover, the electrically driven vehicle 1 includes: a power supply port 104, which serves as an insertion port for the charging gun GN of the charging facility 2, and has an external power line 107 connected thereto; and power storing means 105, in which the power line 107 in an inside is branched at the power supply port 104, is connected to the power storing means 105 for a purpose of the power supply, and is connected to the charge-communicating means 103 for a purpose of the charge communication.

Note that the description has been made above on the assumption that the charge communication is performed by the PLC using the charging cable; however, the present invention is applicable even to a case of a charging system using a charging cable in which the power line and the communication line are independent each other, and in that case, in an inside of the electrically driven vehicle 1, a configuration, in which a signal line for the charge communication is connected to the charge-communicating means 103.

The route setting means 100 includes, as functional blocks: an input/output IF (interface) unit 1000 for receiving the travel plan information and presenting the charging plan; and a route calculation unit 1005 for setting the running route.

The travel plan information notifying means 101 includes, as functional blocks: a travel plan information creation unit 1002 that creates the travel plan information transmitted to the management center 4; and a charging information management unit 1004 that manages information of the charging plan, which is received from the management center 4.

The vehicle information managing means 102 includes a vehicle information management unit 1001, which manages the storage battery information, as a functional block.

The charge-communicating means 103 includes a charge communication unit 1003, which communicates with the charging facility 2 through the power line 107, as a functional block.

The storing means 108 holds the charging plan and the charging facility information, and also holds the information of the place of departure, the place of transit, the destination, the time of departure, and the staying time, which is the travel plan information for calculating the running route, the information being preset by the user. Note that the travel plan information also includes information of the vehicle type of the electrically driven vehicle 1.

Figure 6:
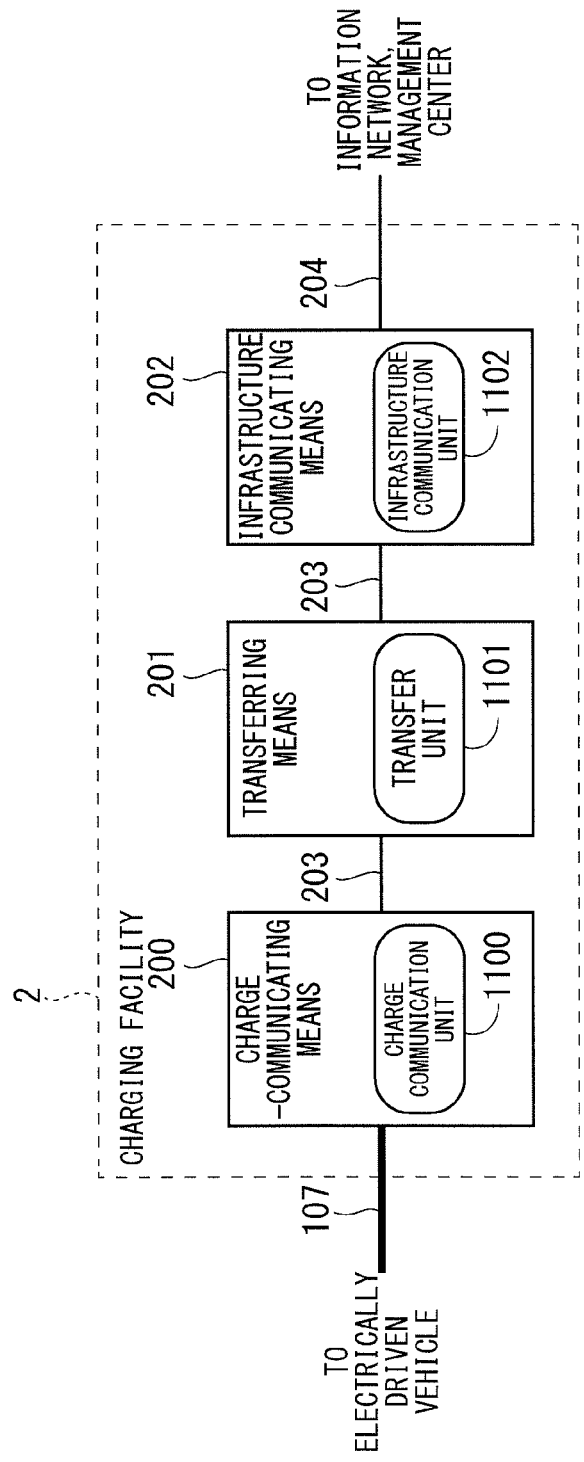
FIG. 6 is a block diagram illustrating a configuration of a charging facility.

FIG. 6 is a block diagram illustrating an example of the configuration of the charging facility 2. As illustrated in FIG. 6, the charging facility 2 includes charge-communicating means 200, transferring means 201, and infrastructure communicating means 202.

The charge-communicating means 200 is connected to the electrically driven vehicle 1 through the power line 107, and the infrastructure communicating means 202 is connected to the management center 4 (FIG. 1) through the information network 3 (FIG. 1) by an external communication line 204. The transferring means 201 is provided between the charge-communicating means 200 and the infrastructure communicating means 202, and is connected to the charge-communicating means 200 and the infrastructure communicating means 202 by signal lines 203.

The charge-communicating means 200 includes a charge communication unit 1100, which performs the charge communication with the electrically driven vehicle 1, as a functional block.

The infrastructure communicating means 202 includes an infrastructure communication unit 1102, which performs infrastructure communication with the management center 4 through the information network 3 (FIG. 1) by the external communication line 204, as a functional block.

The transferring means 201 includes a transfer unit 1101, which transfers communication between the charge communication and the infrastructure communication, as a functional block.

Figure 7:
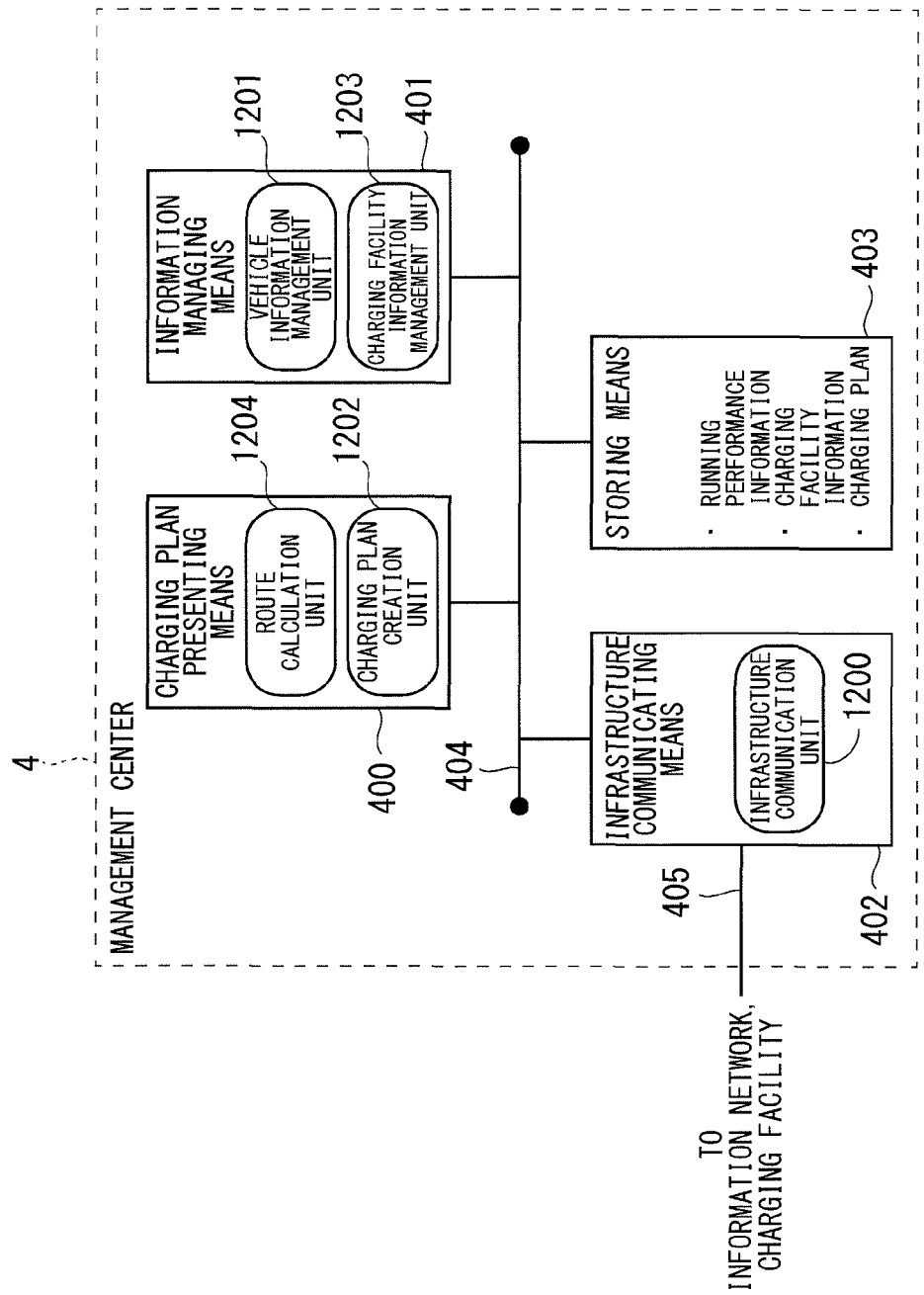
FIG. 7 is a block diagram illustrating a configuration of a management center.

FIG. 7 is a block diagram illustrating an example of the configuration of the management center 4. As shown in FIG. 7, the management center 4 includes charging plan presenting means 400, information managing means 401, infrastructure communicating means 402, and storing means 403. The charging plan presenting means 400, the information managing means 401, the infrastructure communicating means 402 and the storing means 403 are connected to an in-center network 404, and mutually communicate information with one another. Moreover, the infrastructure communicating means 402 is connected to the charging facility 2 (FIG. 1) through the information network 3 (FIG. 1) by a communication line 405.

The charging plan presenting means 400 includes, as functional blocks: a route calculation unit 1204 that calculates the running route based on the travel plan information received from the electrically driven vehicle 1; and a charging plan creation unit 1202 that creates the charging plan based on the calculated running route.

The information managing means 401 includes, as functional blocks: vehicle information management unit 1201 that acquires running performance information as power consumption per distance for each vehicle type from the storing means 403; and charging facility information management unit 1203 that acquires and updates the charging facility information.

The infrastructure communicating means 402 includes an infrastructure communication unit 1200, which performs the infrastructure communication with the management center 4 through the information network 3 (FIG. 1) by the communication line 405, as a functional block.

The storing means 403 holds the running performance information for each vehicle type, and the information of the respective charging facilities 2, and in addition, holds the charging plan created by the charging plan creation unit 1202 of the charging plan presenting means 400.

<Flow of Information Between Functional Blocks>

Figure 8:
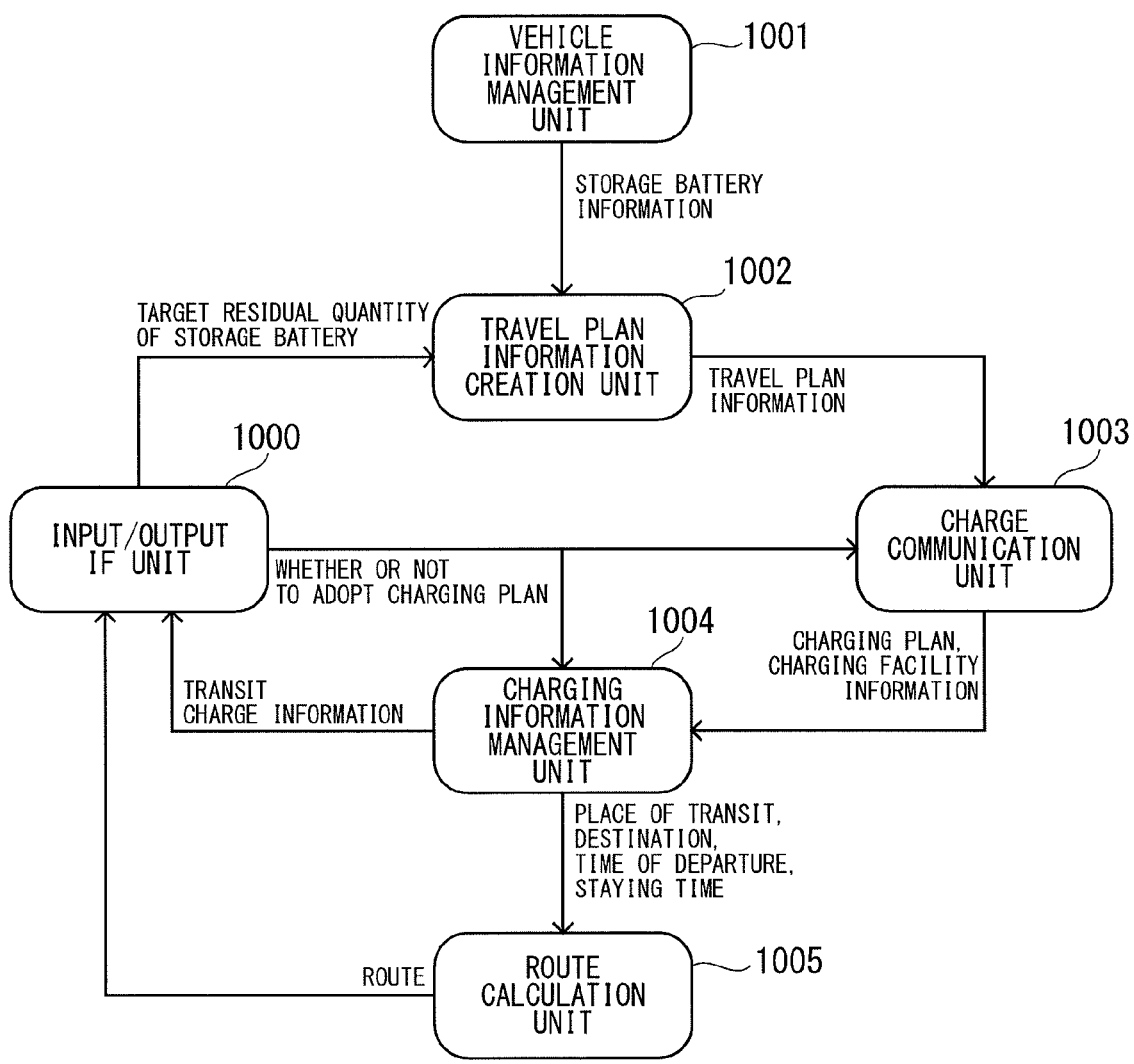
FIG. 8 is a diagram illustrating a flow of information between functional blocks of the electrically driven vehicle.

Next, a description is made of a flow of the information in the electrically driven vehicle 1, the charging facility 2 and the management center 4. FIG. 8 is a diagram illustrating a flow of the information between the functional blocks of the electrically driven vehicle 1. As illustrated in FIG. 8, the electrically driven vehicle 1 includes, as the functional blocks: the input/output IF unit 1000; the vehicle information management unit 1001; the travel plan information creation unit 1002; the charge communication unit 1003; the charging information management unit 1004; and the route calculation unit 1005.

The input/output IF unit 1000 receives input of the target residual quantity of the storage battery from the user. Moreover, from the charging information management unit 1004, the input/output IF unit 1000 receives transit charge information such as the position, the charging time, the quantity of the charged power, the charge fee and the congestion degree regarding the charging facility 2 via which the electrically driven vehicle 1 passes, and in addition, acquires the running route, which passes via the charging facility 2, from the route calculation unit 1005, presents the running route and the transit charge information to the user, and receives the acceptance or refusal of the charging plan by the user. Moreover, the input/output IF unit 1000 extracts the current place, which is included in the running route, as the place of departure.

Note that, though exchange of the information with the user is not illustrated in FIG. 8, the input/output IF unit 1000 is configured, for example, to be connected to a car navigation system, in which the information is presented to the user through a display screen of the car navigation system, and the user inputs the acceptance or refusal of the transit charge information by touching the display screen, and so on.

The vehicle information management unit 1001 manages the storage battery information such as the storage battery capacity and the scheduled residual quantity of the storage battery at the time of departure, and gives the information to the travel plan information creation unit 1002.

The travel plan information creation unit 1002 acquires the target residual quantity of the storage battery from the input/output IF unit 1000. Moreover, the travel plan information creation unit 1002 acquires the place of departure, the place of transit, the destination, the time of departure, and the staying time, which are held as the travel plan information in the storing means 108 (FIG. 5), and moreover, acquires the storage battery information from the vehicle information management unit 1001. Then, the travel plan information creation unit 1002 creates travel plan information including all of these, gives the created travel plan information to the charge communication unit 1003, and in addition, holds the created travel plan information in the storing means 108 again.

The charge communication unit 1003 transmits the travel plan information, which is acquired from the travel plan information creation unit 1002, and such information as to whether or not to adopt the charging plan, the information being acquired from the input/output IF unit 1000, to the charging facility 2 by the charge communication. Moreover, charge communication unit 1003 receives the charging plan and the charging facility information from the charging facility 2 by the charge communication, and gives these to the charging information management unit 1004.

The charging information management unit 1004 acquires the charging plan and the charging facility information from the charge communication unit 1003, and acquires the transit charge information, the place of transit and the staying time from these. Moreover, the charging information management unit 1004 acquires the travel plan information from the storing means 108, and acquires the destination and the time of departure from the travel plan information, acquires the information as to whether to accept or refuse the charging plan from the input/output IF unit 1000, and holds the charging plan and the charging facility information in the storing means 108 in a case of accepting the charging plan. Meanwhile, in a case of refusing the charging plan, the charging information management unit 1004 acquires the travel plan information from the storing means 108, and acquires the place of transit, the destination, the time of departure and the staying time from the travel plan information.

The route calculation unit 1005 acquires the place of transit, the destination, the time of departure and the staying time from the charging information management unit 1004, and calculates the running route from the current place to the destination. Note that the route calculation unit 1005 pinpoints the current place by using a GPS (global positioning system) or the like.

Figure 9:
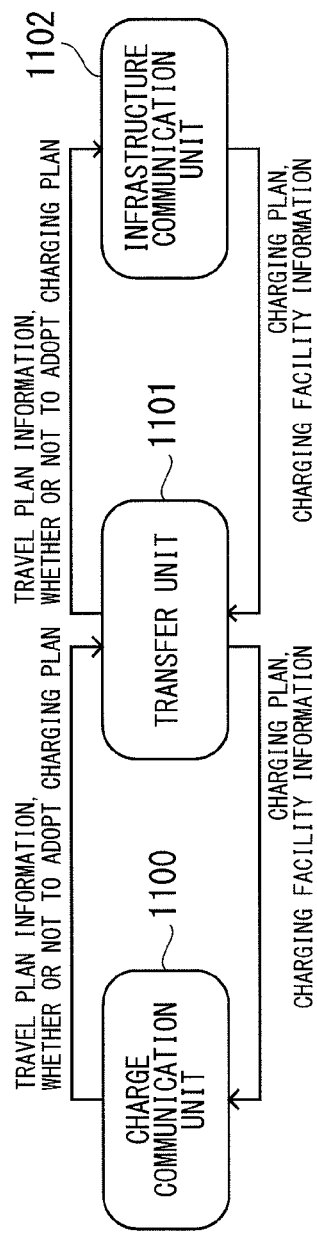
FIG. 9 is a diagram illustrating a flow of information between functional blocks of the charging facility.

FIG. 9 is a diagram illustrating a flow of the information between the functional blocks of the charging facility 2. As illustrated in FIG. 9, the charging facility 2 includes, as functional blocks: a charge-communication unit 1100, a transfer unit 1101, and an infrastructure communication unit 1102.

From the electrically driven vehicle 1 by the charge communication, the charge communication unit 1100 receives the travel plan information and the information as to whether or not to adopt the charging plan, and gives the received information to the transfer unit 1101, in addition, acquires the charging plan and the charging facility information from the transfer unit 1101, and transmits the acquired information to the electrically driven vehicle 1 by the charge communication.

From the charge communication unit 1100, the transfer unit 1101 acquires the travel plan information and the information as to whether or not to adopt the charging plan, and transfers the acquired information to the infrastructure communication unit 1102. Moreover, the transfer unit 1101 acquires the charging plan and the charging facility information from the infrastructure communication unit 1102, and transfers the acquired information to the charge communication unit 1100.

The infrastructure communication unit 1102 receives the charging plan and the charging facility information from the management center 4, and moreover, acquires the travel plan information and the information as to whether or not to adopt the charging plan from the transfer unit 1101, and transmits the acquired information to the management center 4.

Figure 10:
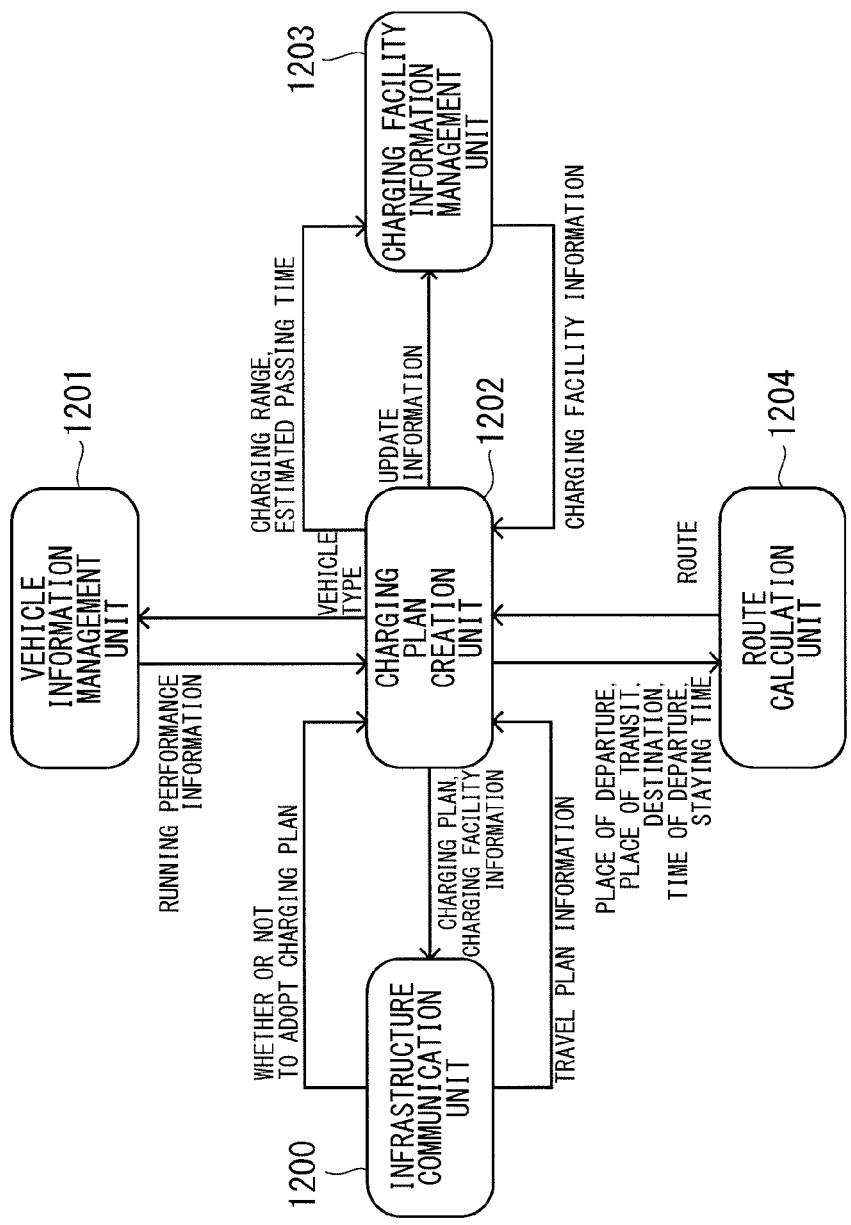
FIG. 10 is a diagram illustrating a flow of information between functional blocks of the management center.

FIG. 10 is a diagram illustrating a flow of the information between the functional blocks of the management center 4. As illustrated in FIG. 10, the management center 4 includes, as the functional blocks: the infrastructure communication unit 1200; the vehicle information management unit 1201; the charging plan creation unit 1202; the charging facility information management unit 1203; and the route calculation unit 1204.

From the charging facility 2, the infrastructure communication unit 1200 receives the travel plan information and the information as to whether or not to adopt the charging plan. Moreover, the infrastructure communication unit 1200 acquires the charging plan and the charging facility information from the charging plan creation unit 1202, and transmits the acquired charging plan and charging facility information to the charging facility 2.

Based on the information on the vehicle type which is acquired from the charging plan creation unit 1202, the vehicle information management unit 1201 acquires running performance information which corresponds thereto, from the storing means 403 (FIG. 7).

The charging plan creation unit 1202 acquires the travel plan information from the infrastructure communication unit 1200, acquires the running performance information from the vehicle information management unit 1201, acquires the charging facility information from the charging facility information management unit 1203, acquires the running route from the route calculation unit 1204, and creates the charging plan. Moreover, if the charging plan is adopted as a result of acquiring the information as to whether or not to adopt the charging plan from the infrastructure communication unit 1200, the charging plan creation unit 1202 creates a scheduled time and length of time for using the charging facility 2, which is for use in the charging plan, as update information of the charging facility 2.

The charging facility information management unit 1203 acquires information of a charge range and an estimated passing time (to be described later) from the charging plan creation unit 1202, and acquires information of such a charging facility 2, in which the congestion degree does not exceed a threshold value within the charge range, from the storing means 403 (FIG. 7). Moreover, the charging facility information management unit 1203 acquires the update information of the charging facility 2 from the charging plan creation unit 1202, and updates the congestion degree in the charging facility information of the storing means 403 based on the acquired update information.

Note that, with regard to the congestion degree in this preferred embodiment, information thereof is managed every time period for each of the charging facilities 2 by the charging facility information management unit 1203, and the congestion degree is defined as the number of vehicles which are scheduled to use the charging facility 2 in the same time period in the charging plan of the electrically driven vehicle 1 that uses the charging facility information providing system. Moreover, it is defined that the threshold value of the congestion degree is preset by the management center.

Figure 11:
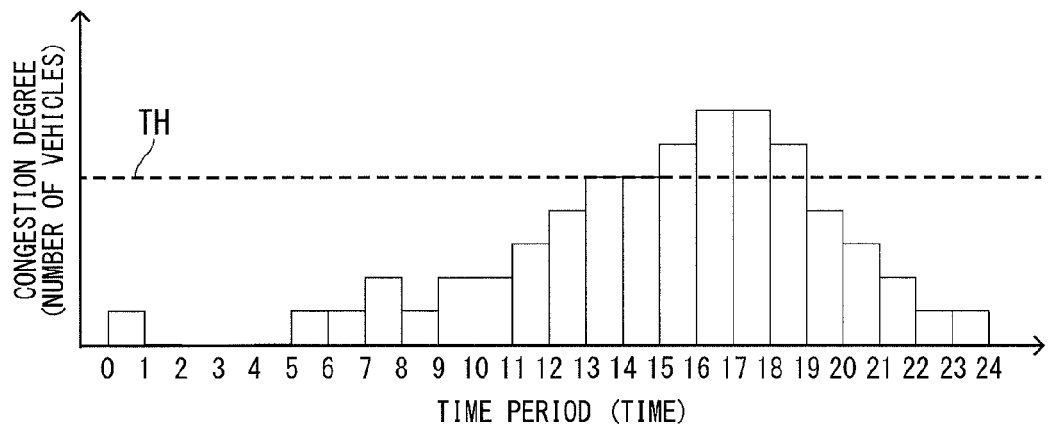
FIG. 11 is a graph illustrating an example of a congestion degree and a threshold value every time period.

FIG. 11 illustrates an example of the congestion degree and the threshold value every time period in a certain charging facility 2. In FIG. 11, an example is illustrated, where a peak of the congestion degree stays between 16:00 and 18:00, and where the threshold value TH is set at a congestion degree of approximately 80% of the peak thereof.

The route calculation unit 1204 acquires the information of the place of departure, the place of transit, the destination, the time of departure and the staying time from the charging plan creation unit 1202, and calculates the running route that passes via the charging facility 2.

<Processing Flow of Transmission of Travel Plan Information>

Figure 12:
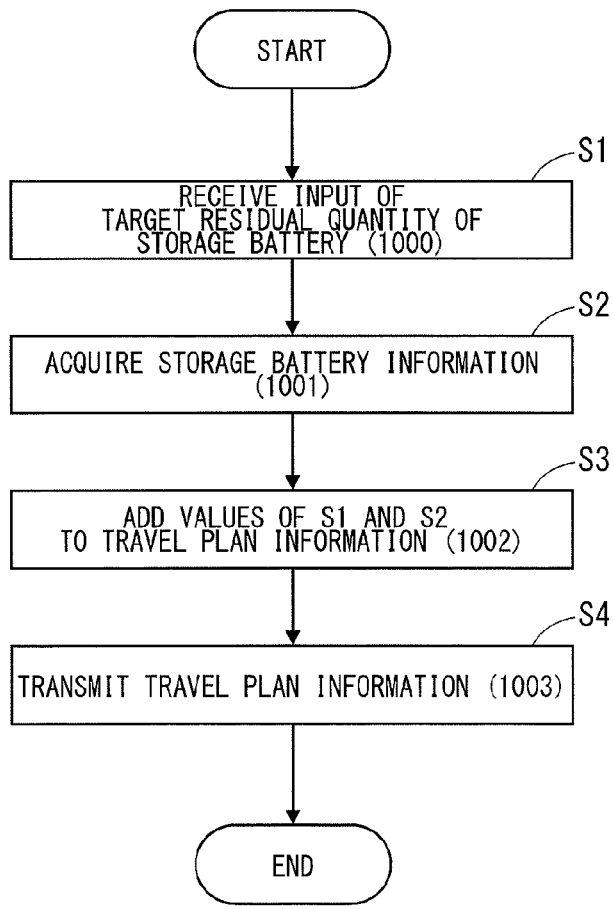
FIG. 12 is a flowchart explaining travel plan information transmission processing in the electrically driven vehicle.

By using a flowchart illustrated in FIG. 12, a description is made of an example of transmission processing of the travel plan information in the electrically driven vehicle 1 while referring to FIG. 5. Note that, in FIG. 12, numbers in parentheses of the respective steps represent reference numerals of the functional blocks which perform the processing.

The charging gun GN of the charging facility 2 is inserted into the power supply port 104, whereby the charge communication using the charging cable is started, and in a case where the running route is preset, the input/output IF unit 1000 receives the information of the target residual quantity of the storage battery from the user (Step S1). Note that, in a case where the target residual quantity of the storage battery is not input from the user within a fixed time after the charge communication is started, a minimum value (for example, several percent) for allowing the electrically driven vehicle 1 to arrive at the destination without allowing a deficiency of the power of the storage battery is used as the information of the target residual quantity of the storage battery.

Here, the target residual quantity of the storage battery is a target value of the residual quantity of the storage battery at a time when the electrically driven vehicle 1 arrives at the destination. When this target residual quantity of the storage battery is set high, the electrically driven vehicle 1 is capable of running farther even immediately after arriving at the destination; however, the quantity of the charged power at the place of transit is increased, and there are possibilities that an arrival time at the destination may be delayed, and further, that the charge fee may be increased.

Meanwhile, when the target residual quantity of the storage battery is set low, the quantity of the charged power at the place of transit is further reduced, the arrival time at the destination is advanced, and the charge fee is suppressed to be low; however, it becomes difficult for the electrically driven vehicle 1 to run a long distance immediately after the arrival at the destination.

Hence, what charge state is desired at the arrival time at the destination depends on the user, and convenience for the user can be enhanced by enabling the user to input the target residual quantity of the storage battery.

Note that, in a case where the user inputs the target residual quantity of the storage battery, for example, a configuration in which the car navigation system connected to the input/output IF unit 1000 is used should be adopted. For example, if the charging gun GN is connected in a state where the running route is already preset, then an inquiry screen for creating the charging plan is displayed on a display screen of the car navigation system, and the input of the target residual quantity of the storage battery by the user is accepted. After the reception of the input, the information of the target residual quantity of the storage battery, which is given from the car navigation system through the input/output IF unit 1000, is given through the in-vehicle network 106 to the travel plan information notifying means 101.

Note that, in a case where the charging gun GN is connected in a state where the running route is not set, then a screen to urge the setting of the running route is displayed on the display screen of the car navigation system, the user operates the car navigation system to set the running route in response thereto, and then the processing of Step S1 and subsequent steps is executed. However, in a case where the user does not set the running route within a fixed time, or in a case where the user turns off the car navigation system, then it is determined that the charging facility information providing system is not used, and the following processing is not performed.

Next, in Step S2, the vehicle information management unit 1001 acquires the storage battery information, and in Step S3, the travel plan information creation unit 1002 adds the information, which is acquired in Step S1 and Step S2, to the travel plan information of the storing means 108. Note that the place of departure, the place of transit, the destination, the time of departure, and the staying time are stored in the travel plan information at the time of setting the running route, and meanwhile, it is defined that the information of the vehicle type is held in advance in the travel plan information of the storing means 108 at a time of manufacturing the vehicle.

Next, in Step S4, the charge communication unit 1003 reads out the travel plan information from the storing means 108, and transmits the travel plan information to the charging facility 2 by the charge communication.

<Processing Flow at Time of Receiving Charging Plan and Charging Facility Information>

By using a flowchart illustrated in FIG. 13, a description is made of an example of processing in a case of receiving the charging plan and the charging facility information in the electrically driven vehicle 1 while referring to FIG. 5.

First, in Step S10, the charge communication unit 1003 receives the charging plan and the charging facility information.

Next, in Step S11, from the charging plan and the charging facility information, the charging information management unit 1004 acquires transit charge information regarding the position of the charging facility 2, the charging time, the quantity of the charged power, the charge fee, and the congestion degree, and the place of transit, which includes the charging facility 2, and the staying time therein. Then, in Step S12, the charging information management unit 1004 holds the charging plan and the charging facility information in the storing means 108.

Next, in Step S13, the route calculation unit 1005 calculates the running route, which passes via the charging facility 2, based on the place of transit and the staying time, which are acquired in Step S11, in addition to the place of departure, the destination and the time of departure which are acquired from the travel plan information of the storing means 108.

Next, in Step S14, the input/output IF unit 1000 displays the transit charge information which is acquired in Step S11, and the running route which is calculated in Step S13, to the user, and in Step S15, receives the input of the information as to whether or not to adopt the charging plan. Then, when such adoption is input, then in step S19, the charge communication unit 1003 transmits information which indicates the adoption of the charging plan, the information including an identifier of the charging plan, to the charging facility 2. Meanwhile, in a case where non-adoption of the charging plan is input, then in Step S16, the charging information management unit 1004 discards the charging plan and the charging facility information from the storing means 108, and thereafter, in Step S17, the charging information management unit 1004 acquires the place of transit and the staying time in the travel plan information of the storing means 108. Then, in Step S18, the route calculation unit 1005 calculates a running route which does not pass via the charging facility 2, and in Step S19, the charge communication unit 1003 transmits information which indicates that the charging plan is not adopted, the information including the identifier of the charging plan, to the charging facility 2.

<Processing Flow of Transfer to Management Center>

Next, by using a flowchart illustrated in FIG. 14, while referring to FIG. 6, a description is made of an example of transfer processing for the information, which comes from the electrically driven vehicle 1, to the management center 4 in the charging facility 2.

First, in Step S20, the charge communication unit 1100 receives the information as to whether or not to adopt the travel plan information or the charging plan from the electrically driven vehicle 1.

Next, in Step S21, the transfer unit 1101 acquires the information as to whether or not to adopt the travel plan information or the charging plan from the charge-communicating means 200, and transfers the acquired information to the infrastructure communicating means 202.

Then, in Step S22, the infrastructure communication unit 1102 transmits the information as to whether or not to adopt the travel plan information or the charging plan to the management center 4.

<Processing Flow of Transfer to Electrically Driven Vehicle 1>

Figure 15:
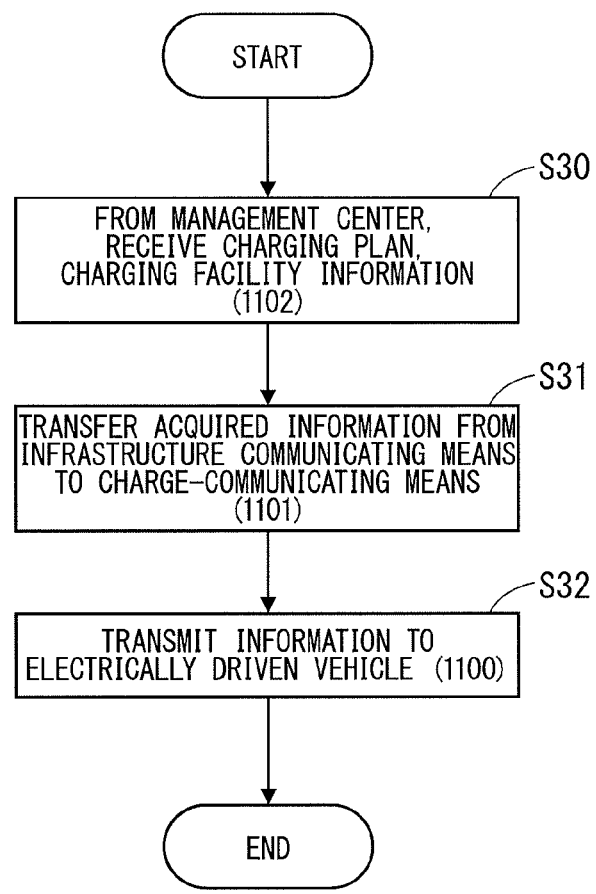
FIG. 15 is a flowchart explaining transfer processing to the electrically driven vehicle in the charging facility.

Next, by using a flowchart illustrated in FIG. 15, while referring to FIG. 6, a description is made of an example of transfer processing for the information, which comes from the management center 4, to the electrically driven vehicle 1 in the charging facility 2.

First in Step S30, the infrastructure communication unit 1102 receives the charging plan and the charging facility information from the management center 4.

Next, in Step S31, the transfer unit 1101 acquires the charging plan and the charging facility information from the infrastructure communicating means 202, and transfers the acquired charging plan and charging facility information to the charge-communicating means 200.

Then, in Step S32, the charge communication unit 1100 transmits the charging plan and the charging facility information to the electrically driven vehicle 1.

<Processing Flow at Time of Receiving Travel Plan Information>

Figure 16:
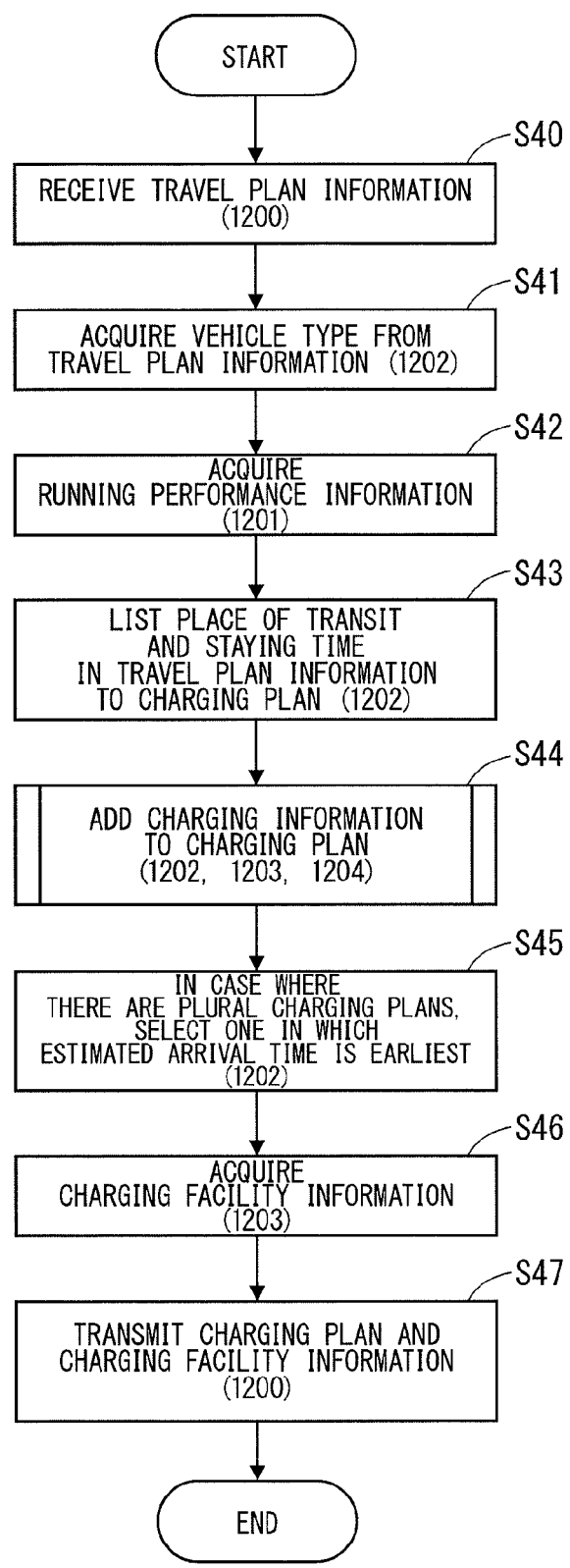
FIG. 16 is a flowchart explaining travel plan information reception processing in the management center.

Next, by using a flowchart illustrated in FIG. 16, a description is made of an example of processing in a case of receiving the travel plan information in the management center 4 while referring to FIG. 7.

First, in Step S40, the infrastructure communication unit 1200 receives the travel plan information from the charging facility 2.

Next, in Step S41, the charging plan creation unit 1202 acquires the information of the vehicle type from the travel plan information, and in Step S42, the vehicle information management unit 1201 acquires the information of the power consumption per distance as the running performance information regarding the vehicle of the acquired vehicle type from the storing means 403.

Next, in Step S43, the charging plan creation unit 1202 lists the place of transit and the staying time in the travel plan information to the charging plan.

Next, in Step S44, the charging plan creation unit 1202, the charging facility information management unit 1203 and the route calculation unit 1204 add pieces of the charging information in a plurality of the charging facilities 2 in each of which the congestion degree is low, and create a plurality of the charging plans.

Then, in Step S45, in the storing means 403, the charging plan creation unit 1202 holds, as the charging plan, one in which the estimated arrival time is the earliest among the plurality of charging plans acquired in Step S44.

Next, in Step S46, the charging information facility management unit 1203 acquires the charging facility information for the charging facility 2 listed in the charging plan, and in Step S47, the infrastructure communication unit 1200 transmits the charging plan and the charging facility information to the charging facility 2.

<Processing Flow of Adding Charging Information to Charging Plan>

Figure 17:
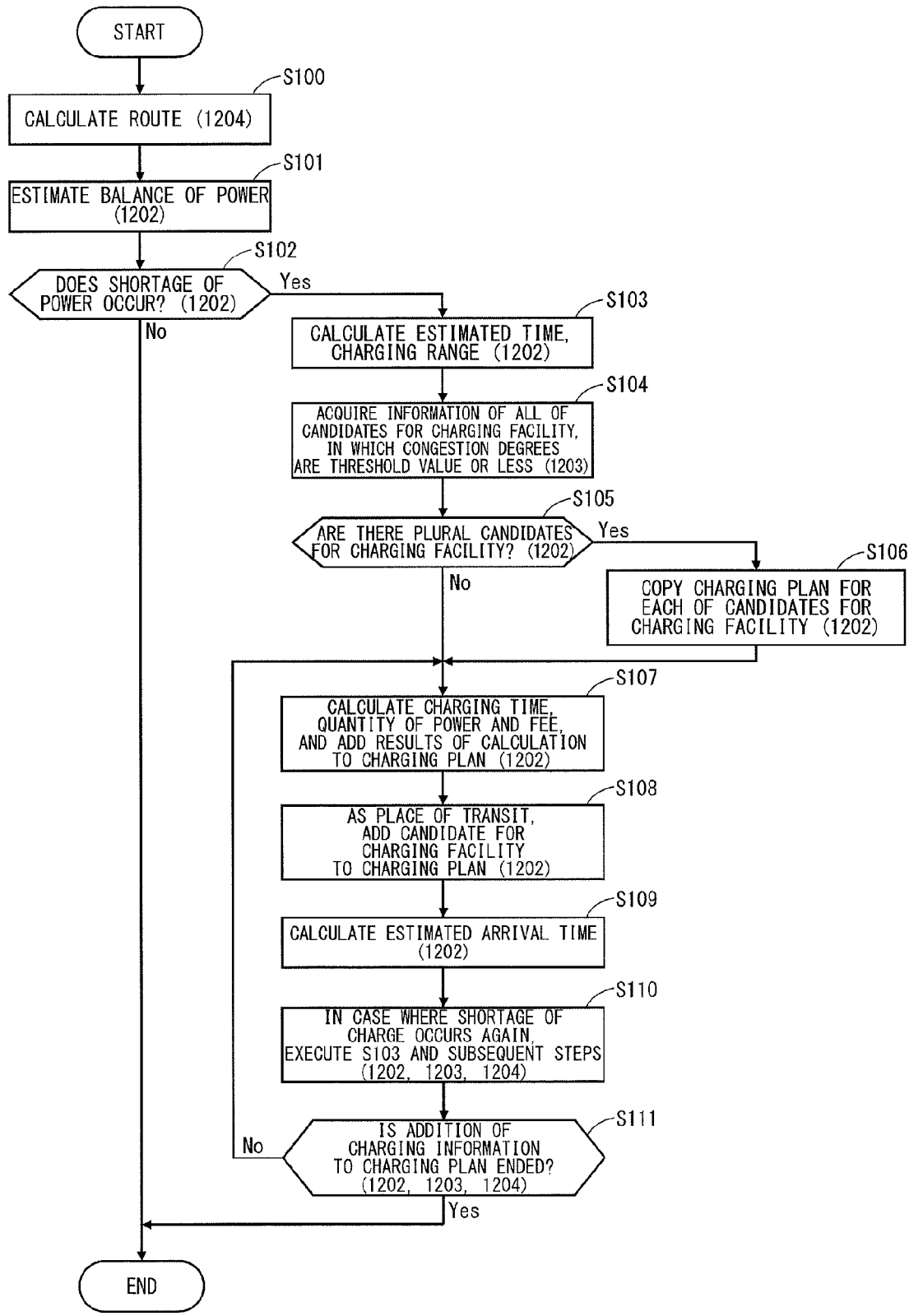
FIG. 17 is a flowchart explaining processing for adding charging information to the charging plan.

Next, by using a flowchart of FIG. 17, while referring to FIG. 7, a description is made of an example of processing (processing in Step S44 in FIG. 16) for adding the charging information to the charging plan in the management center 4.

First, in Step S100, the route calculation unit 1204 calculates the running route, which passes via the charging facility 2, based on the place of departure, the destination and the time of departure in the travel plan information, and on the place of transit and the staying time in the charging plan.

Next, in Step S101, based on the running route calculated in Step S100 and the power consumption per distance, which is acquired in Step S42 of FIG. 16, the charging plan creation unit 1202 estimates a balance between the power consumption by the running and the quantity of the charged power at the charging facility 2 via which the electrically driven vehicle 1 passes. As a result, in a case where it is understood at the destination that the quantity of the charged power falls down below the target residual quantity of the storage battery, which is listed in the travel plan information, resulting in the shortage of the charge (Step S102), then the charging plan creation unit 1202 performs processing for acquiring the charging facility information in Step S103 and subsequent steps. Meanwhile, in a case where the shortage of the charge does not occur, the charging plan creation unit 1202 does not acquire the charging facility information, and ends the creation of the charging plan.

In Step S103, the charging plan creation unit 1202 calculates a location A, at which the residual quantity of the storage battery becomes a threshold value or less, based on the running route calculated in Step S100, and the power consumption per distance, which is acquired in Step S42 of FIG. 16. Moreover, the charging plan creation unit 1202 calculates a time when the electrically driven vehicle 1 passes through the location A, and moreover, calculates, as the charge range, a circular region, in which the location A is taken as a center, and a radius is a distance by which the electrically driven vehicle 1 is capable of running therefrom. Note that the threshold value of the residual quantity of the storage battery is preset n the management center 4.

Figure 18:
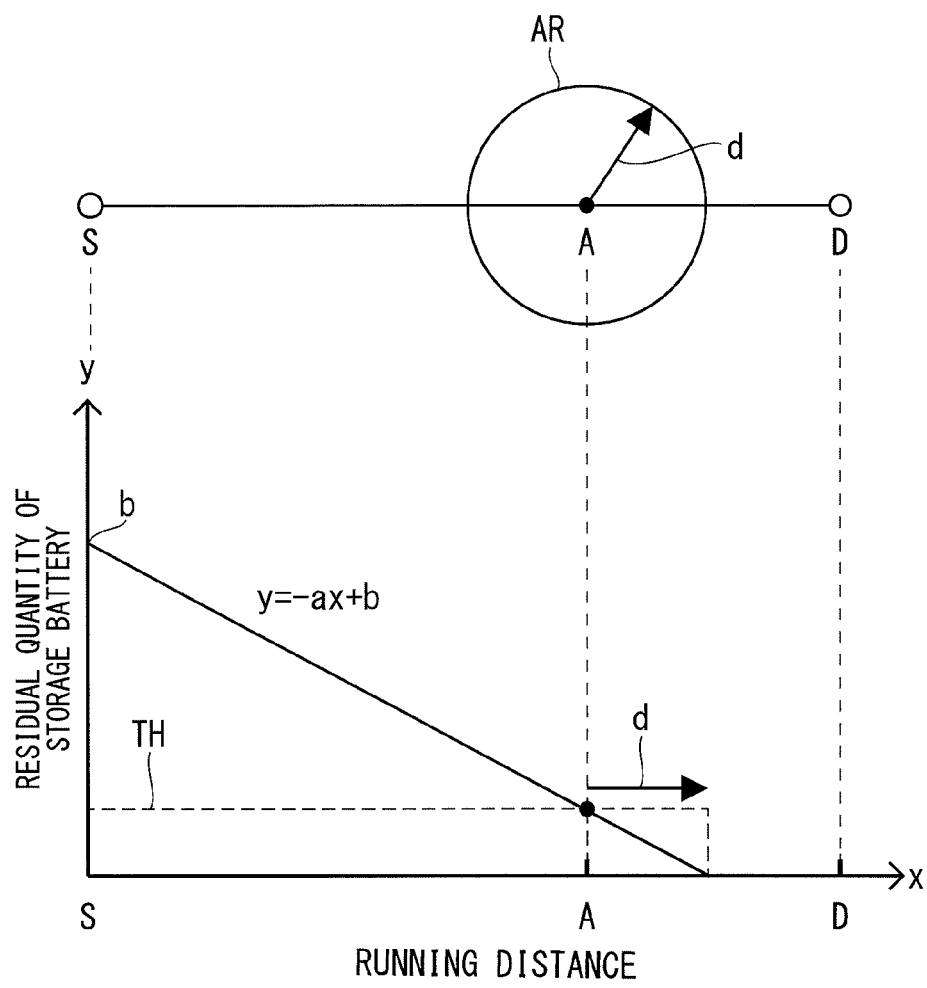
FIG. 18 is a diagram schematically illustrating a charge range.

FIG. 18 is a diagram schematically illustrating the charge range. An upper drawing of FIG. 18 illustrates a running route from a place of departure S to a destination D, the location A where the residual quantity of the storage battery becomes the threshold value, and a charge range AR as the circular region with a radius of a distance d by which the electrically driven vehicle 1 is capable of running therefrom. A lower drawing of FIG. 18 is a diagram showing relationships between the locations S, D and A in the upper drawing and the distance d, in which the distance is taken on an x-axis, and the residual quantity of the storage battery is taken on a y-axis.

As illustrated in FIG. 18, in a graph of a primary line ($y=-ax+b$) between the running distance and the residual quantity of the storage battery, an inclination a is the power consumption per distance, b as a y-intercept is an initial residual quantity of the storage battery. At the location A at which the residual quantity y of the storage battery becomes the threshold value, a distance to an x-intercept becomes the radius d of the charge range.

Here, the processing returns to FIG. 17. In Step S104, the charging facility information management unit 1203 extracts such charging facilities 2 present in the charge range calculated in Step S103, calculates the time period, at which the electrically driven vehicle 1 passes through the respective charging facilities 2, by the estimated a time which is calculated in Step S103, and distances from the location A, extracts all of the charging facilities 2, in which the congestion degrees become equal to or less than the threshold value TH (FIG. 11) in that time period, as candidates for the charging facility, and acquires the charging facility information. Note that, in a case where there is no charging facility 2 in which the congestion degree becomes the threshold value or less, the charging facility information management unit 1203 selects the charging facility 2 in which the congestion degree is the lowest, as the candidate for the charging facility.

Note that the reason why the charging facility information management unit 1203 selects the candidate for the charging facility based on the congestion degree is in order to prevent a demand for power in a specific area from being concentrated by the charge since there is a possibility that the demand for power in the specific area may be strained if the charge is concentrated onto the charging facility 2 in that area. Therefore, the charging facility information management unit 1203 may select the candidate for the charging facility based on not the congestion degree but a degree of concentration of the demand for power. In this case, the charging facility information management unit 1203 may define a ratio of the demand for power with respect to power suppliable to the area concerned as a degree of concentration of the demand for power, and may extract the charging facility 2 in the area, in which the ratio of the demand for power becomes a threshold value of less with respect to the degree of concentration of the demand for power, as the candidate for the charging facility. Note that it is defined that the threshold value of the degree of congestion or the threshold value of the degree of concentration of the demand for power in the area is preset in the management center 4.

Then, the charging plan creation unit 1202 determines whether or not a plurality of the candidates for the charging facility are extracted in Step S104, (Step S105), and copies the charging plan for each of the candidates for the charging facility in a case where the plurality of the candidates for the charging facility are extracted (Step S106), and the processing proceeds to step S107. Meanwhile, in a case where one candidate for the charging facility is extracted in Step S104, the processing proceeds to Step S107.

Steps S107, S108, S109, S110 and S111 are steps subjected to loop processing by the number of acquired candidates for the charging facility.

That is to say, in Step S107, for one of the acquired candidates for the charging facility, the charging plan creation unit 1202 calculates the charging time, the quantity of the charged power and the charge fee based on information of the candidates for the charging facility, and adds the charging time, the quantity of the charged power and the charge fee, to the charging plan corresponding to that candidate for the charging facility.

Next, in Step S108, the charging plan creation unit 1202 adds the candidate for the charging facility as the place of transit and the charging time as the staying time, to the charging plan corresponding to the candidate for charging facility.

Then, in Step S109, the charging plan creation unit 1202 calculates the estimated arrival time based on such a required time calculated in Step S100 and the charging time and the staying time which are listed in the charging plan, and then lists the calculated estimated arrival time in the charging plan.

Step S110 is recursive processing, and the processing of Step S100 and subsequent steps is executed, whereby, in Step S102, the charging plan creation unit 1202 determines whether or not the shortage of the charge occurs again after the charge in the acquired candidate for the charging facility, and in a case where the shortage of the charge occurs, the charging plan creation unit 1202 executes the processing of Step S103 and subsequent steps, and further adds the charging information to the charging plan. Note that, in a case where the shortage of the charge does not occur, the charging plan creation unit 1202 ends the processing, and Step S110 as a caller is ended.

Then, in Step S111, it is confirmed whether or not the addition of the charging information to the charging plan is ended, and in the case where the plurality of charging plans are present, the processing of Steps S107 to S109 are repeated for the respective charging plans, and the charging information is added to all of the charging plans with regard to the candidates for the charging facility, which are extracted in Step S104.

Figure 19:
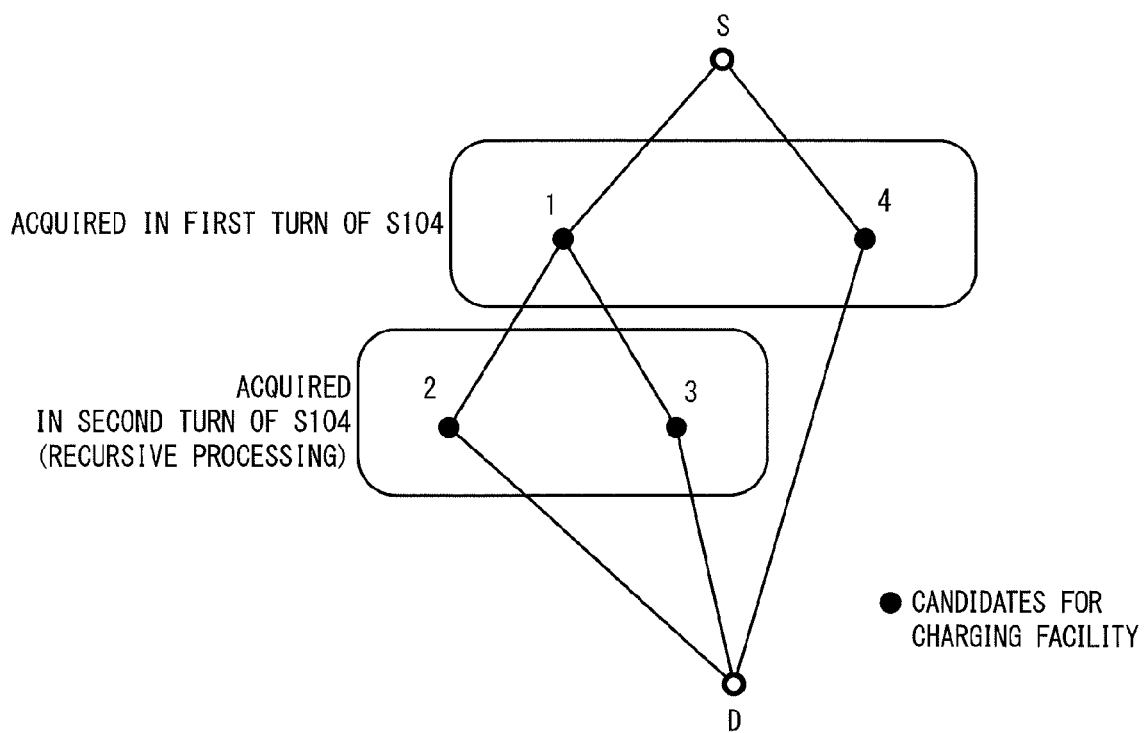
FIG. 19 is a diagram illustrating an example of a procedure of adding the charging information to the charging plan.

Here, by using FIG. 19, a description is made of an example of the procedure of adding the charging information to the charging plan while referring to FIG. 16 and FIG. 17. In FIG. 19, numbers given to vertexes of a tree are additional sequences to the charging plan. In Step S44 of FIG. 16, in order to add the next charging information of the place of departure S, the information of the candidates 1 and 4 for the charging facility is acquired in Step S104 of FIG. 17. In this case, it is determined in Step S105, there are a plurality of candidates for the charging facility, and the charging plan for adding the candidate 4 for the charging facility is copied in Step S106, separately from the candidate 1 for the charging facility. In this case, the processing of Step S107 and subsequent steps is repeated until the charging information is acquired for all of the two candidates for the charging facility.

Then, in Steps S107 to S109 of FIG. 17, first, the charging information of the candidate 1 for the charging facility is added to one of such charging plans, and thereafter, in the example of FIG. 19, by the recursive processing in Step S110, it is determined in Step S102 that the shortage of the charge occurs again after the charge to the candidate 1 for the charging facility, and a second turn of Step S104 is executed.

In the second turn of Step S104, information of candidates 2 and 3 for the charging facility is acquired, and in Step S106, the charging plan for adding the candidates 1 and 3 for the charging facility is further copied separately from the candidates 1 and 2 for the charging facility. Then, passing through Steps S107 to S109, the charging information of the candidate 2 for the charging facility is added to one of the charging plans, and further, the recursive processing in Step S110 is performed, and in the example of FIG. 19, it is determined in Step S102 that the shortage of the charge does not occur after the charge in the candidate 2 for the charging facility. Thereafter, in a similar way, passing through Steps S107 to S109, the charging information of the candidate 3 for the charging facility is added to the other charging plan. In the example of FIG. 19, it is determined in Step S102 that the shortage of the charge does not occur after the charge in the candidate 3 for the charging facility, and then the processing proceeds to Step S111, and the processing for adding the charging information of the candidates 1 and 2 for the charging facility and the candidates 1 and 3 for the charging facility is ended.

Subsequently, the processing returns to the processing for the candidate 4 for the charging facility, which is acquired in the first turn of Step S104, and in Steps S107 to S109, the charging information of the candidate 4 for the charging facility is added to other charging plan than that of the candidate 1 for the charging facility. Next, the recursive processing of Step S110 is performed; and in the example of FIG. 19, it is determined in Step S102 that the shortage of the charge does not occur after the charge at the candidate 4 for the charging facility. Then, the processing proceeds to Step S111, the addition of the charging information of the candidates 1 and 4 for the charging facility is ended, and the addition of all of the charging information is ended.

As described above, three charging plans in total are created, in which the candidates 1 and 2 for the charging facility, the candidates 1 and 3 therefor, and only the candidate 4 therefor are added.

Note that the reason why the charge range is set and the plurality of candidates for the charging facility within the charging range are extracted is in order to eliminate such possibilities that the charged power runs out on the way of the route and that the residual quantity of the storage battery falls down below the target thereof at the destination, and the plurality of charging plans are obtained by extracting the plurality of candidates for the charging facility, and accordingly, the processing of Step S107 to S109 is repeated.

<Processing Flow at Time of Receiving Information as to Whether or not to Adopt Charging Plan>

Figure 20:
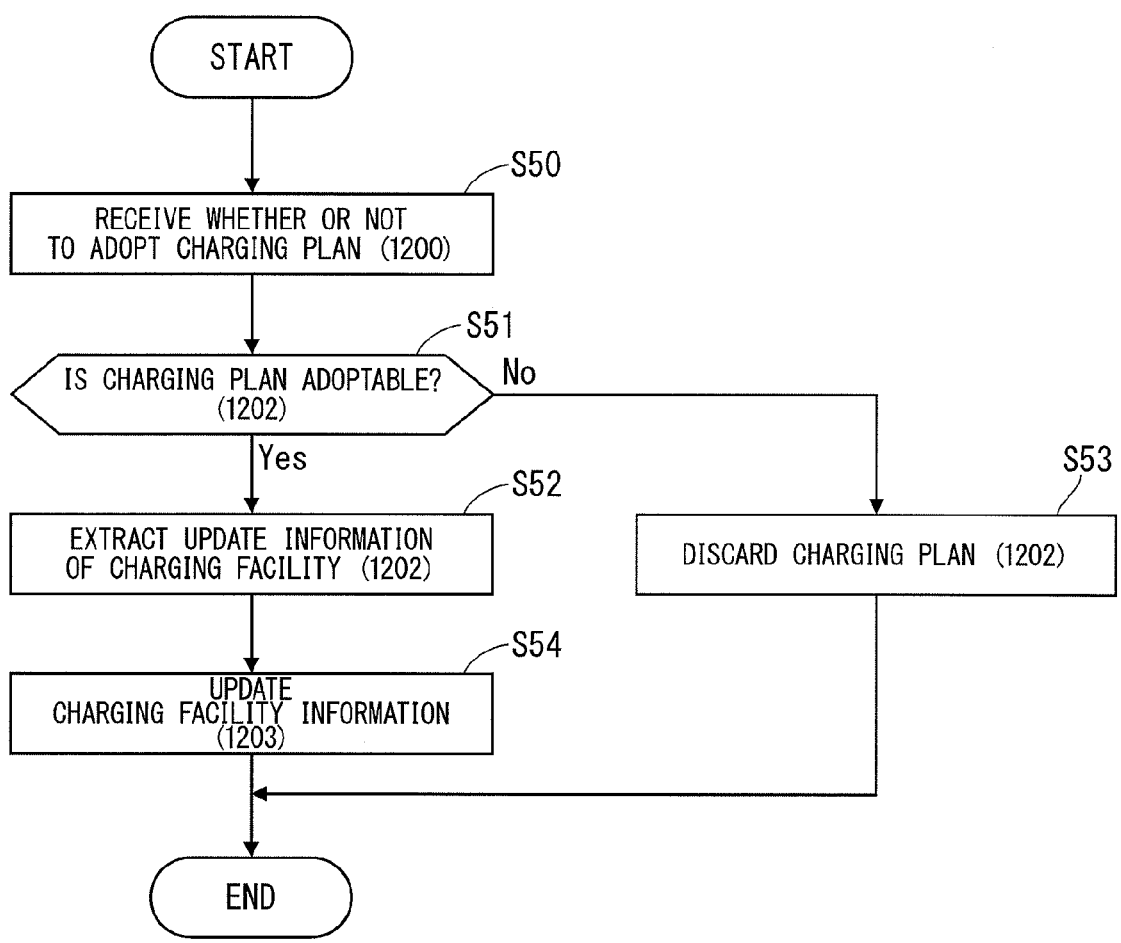
FIG. 20 is a flowchart explaining processing in a case of having received information as to whether or not to adopt the charging plan in the management center.

Next, by using a flowchart illustrated in FIG. 20, while referring to FIG. 7, a description is made of an example of processing in a case of receiving the information as to whether or not to adopt the charging plan in the management center 4.

First, in Step S50, the infrastructure communication unit 1200 receives the information as to whether or not to adopt the charging plan from the charging facility 2.

Next, in Step S51, the infrastructure communication unit 1200 determines whether or not to adopt the charging plan, and the processing proceeds to Step S52 in a case where the charging plan is adopted, and proceeds to Step S53 in a case where the charging plan is not adopted.

Next, in Step S52, the charging plan creation unit 1202 acquires a time of use of the charging facility 2 and a length of time of use thereof as update information from the charging plan of the storing means 403.

Next, in Step S54, the charging facility information management unit 1203 updates the congestion degree of the charging facility information in the storing means 403.

Note that, in the case where the charging plan is not adopted in Step S51, the in Step S53, the charging plan creation unit 1202 discards the charging plan of the storing means 403.

As described above, the travel plan information is transmitted from the electrically driven vehicle 1 by using the already placed charge communication, and the creation of the charging plan and the acquisition of the charging facility information are performed in the management center 4, and accordingly, the shortage of the charge in the electrically driven vehicle 1 can be avoided without requiring high-level calculation or a mobile information terminal in the electrically driven vehicle 1. Moreover, the charging plan is created in the management center 4 in consideration of the congestion degree of the charging facility 2, and accordingly, the demand for power in the area can be distributed.

Note that the charging facility information providing system functions by the fact that the electrically driven vehicle 1 is connected to the charging facility 2, and repeats the processing, which is described by using FIG. 12 to FIG. 17 and FIG. 20, every time when the electrically driven vehicle 1 is connected to the charging facility 2, whereby the power of the storage battery can be prevented from being consumed while the electrically driven vehicle 1 is running. Note that, in the case of adopting the charging plan generated by the management center 4, the candidate for the charging facility may be made so as to be capable of being reserved as the charging facility 2 to be used next.

While the invention has been shown and described in detail, the foregoing description is in all aspects illustrative and not restrictive. It is therefore understood that numerous modifications and variations can be devised without departing from the scope of the invention.

What is claimed is:

1. A charging facility information providing system comprising: an electrically driven vehicle that runs by using, as a drive source, a motor driven by power accumulated in a storage battery;
a charging facility that charges said storage battery of said electrically driven vehicle; and
a management center that exchanges information regarding said electrically driven vehicle with said charging facility through an information network, wherein, in the case of charging said storage battery, charge communication that mutually communicates information for controlling the charge is performed between said electrically driven vehicle and said charging facility, said electrically driven vehicle sends travel plan information to said charging facility by said charge communication during the charge of said storage battery, the travel plan information including a future running route of said electrically driven vehicle itself, said charging facility transfers said travel plan information to said management center through said information network, the travel plan information being sent from said electrically driven vehicle, based on said travel plan information received from said charging facility, said management center creates a charging plan which is matched with said running route of said electrically driven vehicle, acquires charging facility information of a charging facility following said charging facility where said electrically driven vehicle is currently charged at a scheduled charging place included in the charging plan, and sends the charging plan and the charging facility information to said charging facility through said information network, and said charging facility transfers said acquired charging plan and charging facility information to said electrically driven vehicle by said charge communication through a charging cable.

2. The charging facility information providing system according to claim 1, wherein said charging facility information includes information of a congestion degree of a charging facility at said scheduled charging place, and said congestion degree is defined by a number of other vehicles scheduled to be charged in a same time period as that of said electrically driven vehicle.

3. The charging facility information providing system according to claim 2, wherein said management center selects a candidate for said charging facility based on said congestion degree, and in a case where a plurality of said candidates for said charging facility are selected, creates said charging plan for each of said candidates for said charging facility.

4. The charging facility information providing system according to claim 3, wherein said travel plan information includes: storage battery information including a capacity of said storage battery and a scheduled residual quantity of said storage battery; and information of a destination and vehicle type of said electrically driven vehicle.

5. The charging facility information providing system according to claim 4, wherein, based on power consumption per distance, the power consumption being obtained uniquely from said information of the vehicle type, said management center calculates a location where the residual quantity of said storage battery becomes a threshold value or less, calculates, as a charging range, a circular region having the location taken as a center and having a radius that is a distance by which said electrically driven vehicle is capable of running from the center, and selects a charging facility in which said congestion degree does not exceed a threshold value, said charging facility being present in the charging range, as said candidate for said charging facility.

6. The charging facility information providing system according to claim 4, wherein said travel plan information further includes information of a target residual quantity of said storage battery that is a target residual quantity of said storage battery at said destination of said electrically driven vehicle, and said target residual quantity of said storage battery is set for said electrically driven vehicle.

7. An electrically driven vehicle that runs by using, as a drive source, a motor driven by power accumulated in a storage battery, characterized in that in the case of charging said storage battery, said electrically driven vehicle performs charge communication with a charging facility that charges said storage battery, and sends travel plan information to said charging facility, the travel plan information including future running route of said electrically driven vehicle itself, and receives a charging plan and charging facility information from said charging facility by said charge communication through a charging cable, the charging plan being matched with said running route of said electrically driven vehicle, the charging facility information being of a charging facility following said charging facility where said electrically driven vehicle is currently charged at a scheduled charging place included in the charging plan, and the charging plan and the charging facility information being created by said management center based on said travel plan information transferred from said charging facility to a management center.

\* \* \* \* \*